United States Patent [19]
O'Farrell et al.

[11] Patent Number: 5,406,414
[45] Date of Patent: * Apr. 11, 1995

[54] ELECTROCHROMIC REARVIEW MIRROR FOR VEHICLES WITH CONSTANT LIGHT TRANSMITTING AREA

[75] Inventors: Desmond J. O'Farrell; Richard J. Gahan, both of Holland, Mich.

[73] Assignee: Donnelly Corporation, Holland, Mich.

[*] Notice: The portion of the term of this patent subsequent to Oct. 12, 2010 has been disclaimed.

[21] Appl. No.: 115,998

[22] Filed: Sep. 2, 1993

Related U.S. Application Data

[63] Continuation of Ser. No. 874,635, Apr. 27, 1992, Pat. No. 5,253,109.

[51] Int. Cl.⁶ .......................... G02B 5/08; G02B 17/00
[52] U.S. Cl. .......................... 359/604; 359/270; 340/461; 250/206; 345/5; 345/105
[58] Field of Search ............... 359/601, 602, 603, 604, 359/605, 606, 267, 270; 340/461, 784, 785; 250/205, 206; 345/5, 87, 105

[56] References Cited

U.S. PATENT DOCUMENTS

| | | | |
|---|---|---|---|
| 3,612,654 | 10/1971 | Klein | 359/70 |
| 3,612,666 | 10/1971 | Rabinow | 359/604 |
| 3,680,951 | 8/1972 | Jordan et al. | 359/606 |
| 3,722,984 | 3/1973 | Brean | 359/605 |
| 3,806,229 | 7/1974 | Schoot et al. | 359/273 |
| 3,862,798 | 1/1975 | Hopkins | 359/38 |
| 4,097,131 | 6/1978 | Nishiyama | 359/70 |
| 4,165,157 | 8/1979 | Kobale et al. | 359/81 |
| 4,200,361 | 4/1980 | Malvano et al. | 359/38 |
| 4,418,102 | 11/1983 | Ferrato | 428/1 |
| 4,443,057 | 4/1984 | Bauer et al. | 359/606 |
| 4,491,390 | 1/1985 | Tong-Shen | 359/39 |
| 4,521,079 | 6/1985 | Leenhouts et al. | 359/74 |
| 4,572,619 | 2/1986 | Reininger et al. | 359/254 |
| 4,600,273 | 7/1986 | Ohno | 359/81 |
| 4,603,946 | 8/1986 | Kato et al. | 359/38 |
| 4,630,904 | 12/1986 | Pastore | 359/636 |
| 4,640,583 | 2/1987 | Hoshikawa et al. | 359/80 |
| 4,669,825 | 6/1987 | Itoh et al. | 359/38 |
| 4,669,827 | 6/1987 | Fukada et al. | 359/38 |
| 4,671,615 | 6/1987 | Fukada et al. | 359/38 |
| 4,690,508 | 9/1987 | Jacob | 359/38 |
| 4,701,022 | 10/1987 | Jacob | 359/603 |
| 4,741,603 | 5/1988 | Miyagi et al. | 359/270 |
| 4,793,690 | 12/1988 | Gahan et al. | 359/604 |
| 4,799,768 | 1/1989 | Gahan | 359/604 |
| 4,855,727 | 8/1989 | Tsuchiya et al. | 340/785 |
| 4,882,565 | 11/1989 | Gallmeyer | 340/461 |
| 4,886,960 | 12/1989 | Molyneux et al. | 250/206 |
| 4,917,477 | 4/1990 | Bechtel et al. | 359/267 |
| 4,940,315 | 7/1990 | Demiryont | 359/267 |
| 5,253,109 | 10/1993 | O'Farrell et al. | 359/604 |

FOREIGN PATENT DOCUMENTS

| | | |
|---|---|---|
| 173309 | 3/1986 | European Pat. Off. . |
| 2808260 | 8/1979 | Germany . |
| 1131236 | 10/1968 | United Kingdom . |
| 2156295 | 10/1985 | United Kingdom . |

OTHER PUBLICATIONS

Donnelly Electrochromic Brochure, published Feb. 15, 1990.
Gladstone, et al., IBM Technical Disclosure Bulletin, vol. 15, No. 2, Jul., 1972.
Donnelly Compass Mirrors Brochure, published Apr. 30, 1989.

*Primary Examiner*—Georgia Y. Epps
*Assistant Examiner*—Michael A. Papalas
*Attorney, Agent, or Firm*—Price, Heneveld, Cooper, DeWitt & Litton

[57] ABSTRACT

An electro-optic device including first and second optically transparent elements mounted in spaced relationship to each other to define a gap and each having a front and rear surface. At least one optically transparent interlayer element is sandwiched between the first and second elements and joining a predetermined area of the rear surface of the first element and the front surface of the second element. A liquid, semi-liquid, gel, or semi-solid electro-optic medium, whose light transmittance is variable, is added to the gap between the first and second element. One surface of the second element may include a reflective coating except in those areas aligned with the transparent interlayer element sandwiched between the first and second element. A photoelectric cell/sensor or display is disposed behind the rear surface of the second element and may be aligned with the window formed in the reflective coating so as to receive or transmit light through the first element, the transparent interlayer, and the transparent second element.

4 Claims, 2 Drawing Sheets

ELECTROCHROMIC REARVIEW MIRROR FOR VEHICLES WITH CONSTANT LIGHT TRANSMITTING AREA

CROSS REFERENCE TO RELATED APPLICATION

This application is a continuation of prior pending application Ser. No. 07/874,635, filed Apr. 27, 1992, by Desmond J. O'Farrell and Richard J. Gahan, entitled "ELECTRO-OPTIC DEVICE WITH CONSTANT LIGHT TRANSMITTING AREA," now U.S. Pat. No. 5,253,109.

BACKGROUND OF THE INVENTION

The present invention relates to variable transmission or reflection devices, and more particularly, to rearview mirrors capable of automatically changing reflective states in response to control signals derived from varying light levels or manual controls. Moreover, this invention is directed to such mirrors having areas of constant light transmission.

High light levels reflected from a rearview mirror into the eyes of a vehicle operator during night driving can seriously impair the operator's forward vision. Light scatters within the eye causing a "veil" or "curtain" of light over the scene. The driver, therefore, has a reduced ability to detect objects which are dimly lit or have little contrast with the background. This situation is known as "disability glare."

In an effort to alleviate the problems of undesired glare at night, rearview mirrors have recently been equipped with electro-optic devices which reduce the transmission of reflected light with light scattering liquid crystal layers or coloration via electrochromic layers. The light scattering or coloration is responsive to light entering the rear of the vehicle such as from following car headlights and incident upon a photo sensor which controls the current to the electro-optic device.

In order to use open-loop glare detection circuitry of the type disclosed in Gahan et al. U.S. Pat. No. 4,793,690, Gahan U.S. Pat. No. 4,799,768 and Molyneux et al., U.S. Pat. No. 4,886,960, each of which require the photo sensor to have a clear, unobstructed view of the light conditions to the rear of the vehicle, one type of electro-optic mirror includes a sensor in the bezel or housing for the mirror assembly adjacent the reflective surface. However, in order to contain the sensor, the bezel or housing must have a depending portion or chin substantially broader than the remaining portion of the bezel. To some, such housings are less desirable aesthetically. In addition, such mountings require additional mechanical design and tooling and restrict mirror case design options.

Other electro-optic mirrors have included the sensor behind the reflective element of the mirror assembly. A portion of the reflective layer is removed to allow light directed from the rear of the vehicle to pass through the glass layers to the sensor. The sensor then controls a closed-loop detection circuit which generates a signal which is used to darken the electro-optic medium in front of the reflective glass panel. A major disadvantage with locating the sensor behind the reflective surface in electro-optic device is that when the electro-optic device darkens, the amount of light incident upon the sensor is reduced which, in turn, causes the electro-optic device to lighten. As the coloration decreases, the light entering through the rear of the vehicle is again incident on the sensor which again causes the electro-optic device to darken. Thus, the sensor, indirectly controlled by the electro-optic device, is continually wavering between an on and off position. Additional electronic circuitry is then required to compensate for such instability, and glare control is often less than optimum.

Accordingly, a need has existed for an electro-optic mirror which allows the mounting of a photo sensor within the reflective surface of the mirror but avoids alteration of the sensed light due to mirror dimming while allowing use of precisely controlled open-loop detection circuits. Additionally, a need has existed for an electro-optic mirror allowing use of information displays in the reflective viewing surface whose intensity is unaffected by mirror dimming operation.

SUMMARY OF THE INVENTION

This invention provides an electro-optic panel for use in mirror assemblies including an optically clear, light transmitting opening unaffected by mirror dimming operation. A light transmitting, polymeric interlayer, which is electrically and chemically inert, is mounted between two panels of the device and surrounded by the electro-optic medium. The interlayer forms a window providing an uninterrupted light transmitting path from the front panel to the rear panel. A portion of the reflective layer directly opposite the polymeric interlayer window is removed from the rear panel so that light entering the window may be passed through the rear panel.

In one form of the invention, the polymeric window provides a port for a photo sensor used to control the automatic coloration or light scattering layer of the electro-optic device. In another form of the invention, an information display is mounted behind the reflective panel and aligned with the window. In this manner, the display may be viewed through the mirror at all times, regardless of the glare-reducing state of the electro-optic device. In yet another form of the invention, the polymeric interlayer may include a dye so as to color the indicia formed by the display.

Advantages provided by this invention allow the sensor and/or display to be mounted within the area of the mirror instead of dependent from or mounted around the mirror perimeter. With such devices mounted behind the reflective panel, bulky and protruding housing appendages may be avoided, leading to a more unobstructed view for the vehicle driver. Moreover, the instant invention provides that light incident upon the sensor, or emitted from the display, is not attenuated by the glare-reducing state of the electro-optic device. The sensor disposed behind the reflector may sense actual light levels at all times while the electro-optic device is functioning, and may thus be used with precise, accurate glare reducing circuitry.

These and other objects, advantages, purposes and features of the invention will become more apparent from a study of the following description taken in conjunction with the attached drawings described below.

DESCRIPTION OF THE PREFERRED EMBODIMENTS

Figure 1:
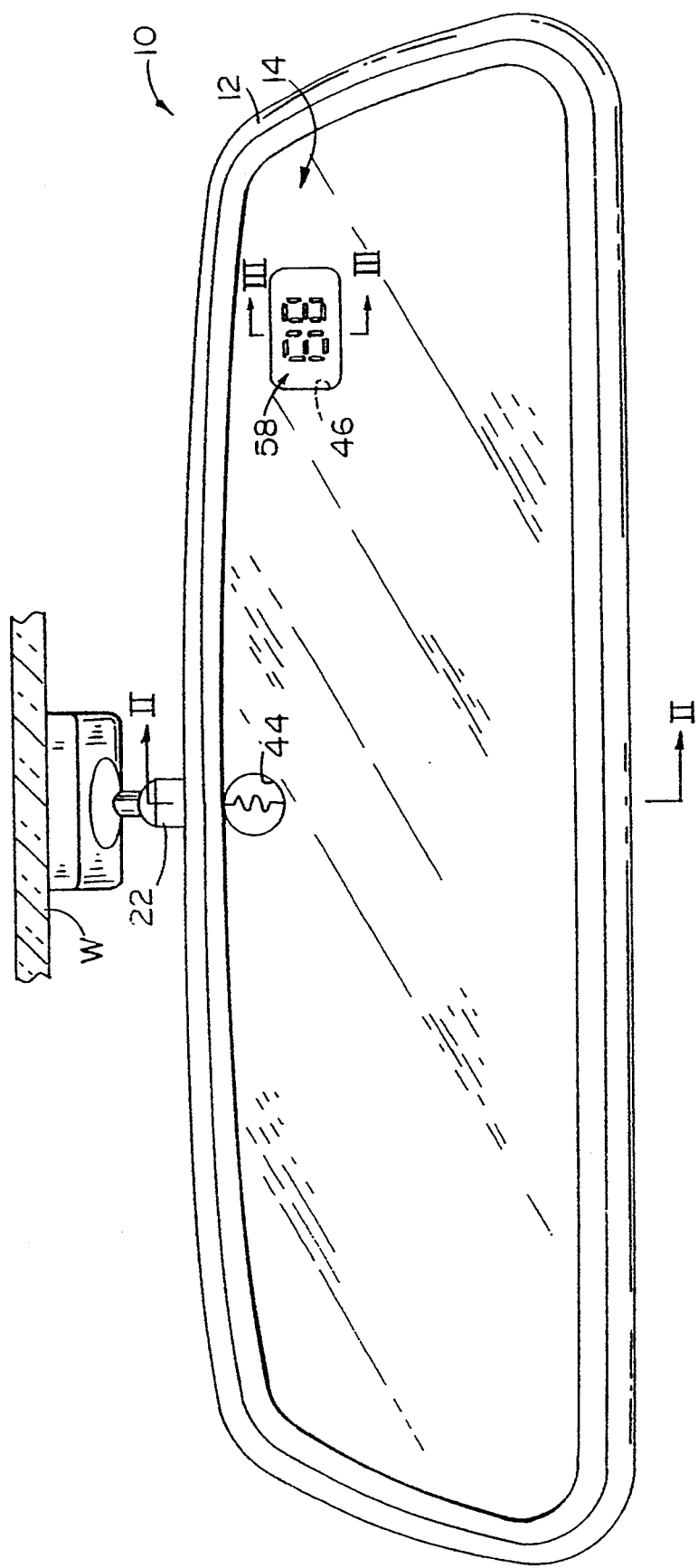
FIG. 1 is a front view of an electro-optic rearview mirror assembly embodying the instant invention.

Referring to the drawing figures, mirror assembly 10 of this invention includes a mirror case or housing 12 preferably molded from polypropylene or another polymeric material for containing electro-optic reflector assembly 14 therein, as well as accommodating sensor and/or display packages 16, 18. Housing 12 typically includes a back wall 12a, peripheral sidewalls 12b and a front, mirror element retaining rim or bezel 12c. The case defines an interior chamber or space in which reflector assembly 14 is mounted by suitable mounting structure (not shown). Also included is a single or double pivot mounting arm 22 which, in turn, is mounted to the vehicle windshield W or roof assembly using any one of a number of conventional coupling methods. Mounting arm 22 is preferably fixed to housing 12 by a ball joint or similar coupling to provide pivotal movement for mirror adjustment.

Figure 2:
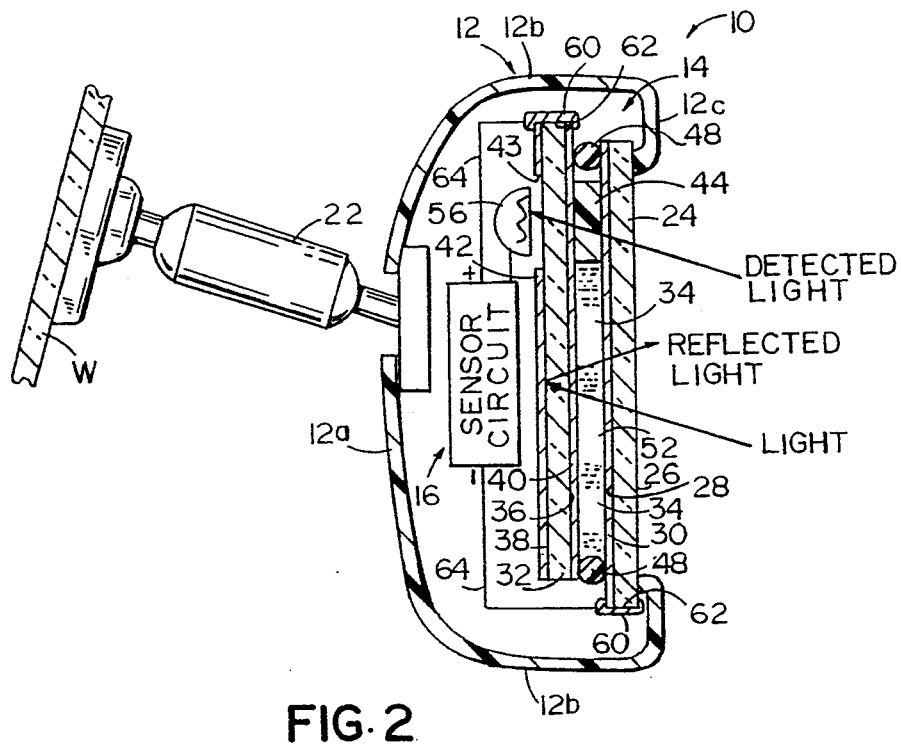
FIG. 2 is a section view through one light transmitting window area of the assembly taken along plane II—II shown in FIG. 1.
Figure 3:
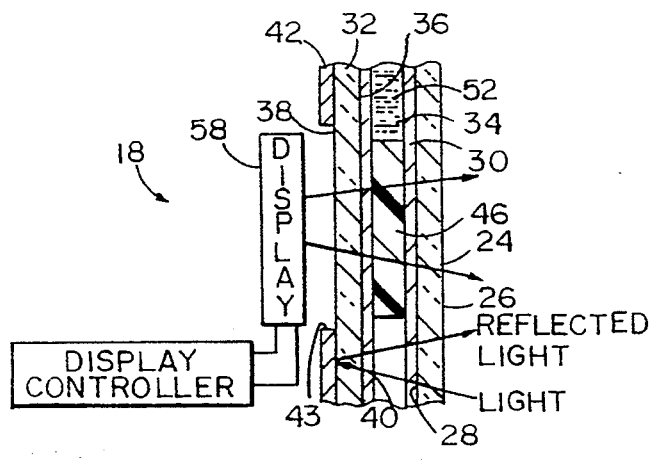
FIG. 3 is an enlarged, fragmentary sectional view of a second light transmitting window area of the mirror assembly of FIGS. 1 and 2, taken along plane III—III of FIG. 1.

As is best seen in FIGS. 2 and 3, reflector assembly 14 includes a front transparent element 24 preferably formed from a sheet of soda lime glass and preferably having a thickness of 0.063 inch and a shape substantially conforming to and adapted to fit within housing 12. Although glass is disclosed, front element 24 may also be made from a variety of transparent, polymeric materials. Front element 24 includes a front and rear surface 26 and 28, respectively, which are substantially parallel to each other in order to transmit light as uniformly as possible. Rear surface 28 of front element 24 is coated with a transparent, electrically conductive layer 30 such as indium-tin oxide (ITO) as is more fully described below. It is preferred that ITO layer 30 be sputter coated onto rear surface 28 in a substantially uniform coating about 1,500 angstroms thick using conventional sputtering techniques.

Front element 24 is aligned in front of and spaced from a back or rear element 32 to form a gap or cavity 34 therebetween. Back element 32 may also be formed from a sheet of soda lime glass of thickness and dimensions similar to that of front element 24. Element 32 includes front and rear surfaces 36 and 38, respectively, which are, in turn, oriented parallel to surfaces 26 and 28 of front element 24. Front surface 36 of back element 32 also includes a transparent, electrically conductive coating 40 of ITO in similar fashion to surface 28 of element 24. Rear surface 38 of element 32 includes a coating of reflective material 42 such as aluminum, or a combination of silver and copper, or other materials such as chromium, stainless steel, platinum, rhodium, palladium, copper, silver or combinations thereof, and having a thickness of between about 500 and 1,000 angstroms. In the alternative, reflective material 42 may be deposited on front surface 36 of element 32 in place of ITO coating 40, in which case layer 42 doubles as an electrically conductive coating. In either case, layer 42 provides a highly specular finish which preferably reflects approximately 80%–90% of the light incident thereon through the front of mirror assembly 10.

At a predetermined position, within the reflective area or field provided by reflective coating 42, elements 24, 32 are interconnected by a transparent, light transmitting, polymeric interlayer element 44 or 46 which is electrically and chemically inert and has a refractive index substantially matching that of elements 24, 32, ITO coatings 30, and electro-optic medium such as an electrochemichromic fluid described below. Preferably, interlayer element 44, 46 is SURLYN ionomer resin, produced by E. I. DuPont Nemours, of Wilmington, Del. Other transparent interlayers may include polyvinyl butyral or polyurethane, chosen for their optical transparency and chemical stability within the electooptic medium 52.

The thickness of interlayer 44, 46 is such that surfaces 28 and 36, covered by ITO coatings 30, 40 thereon, are firmly engaged, bonded and adhered thereto to prevent wicking therebetween of an electro-optic fluid described below. The interlayer 44, 46 is preferably adhered to the ITO coatings on both glass elements 24, 32 by heat and pressure when assembly 14 is formed, as described below. On rear surface 38 of back element 32 directly opposite the location of polymeric interlayer 46, reflective layer 42 is removed and stripped away in area 43 to allow light entering through element 24 to pass directly through the window formed by interlayer 44, 46 and through back element 32. The size of interlayer 44, 46 is matched to opening 43 depending on whether a sensor 56 or an information display 58 is used.

Intermediate surface 28 of front element 24 and surface 36 of back element 32 is a space or gap 34 containing interlayer 44, 46. Space 34 is preferably created by sealing the perimeter of the two elements 24 and 32 with a bead or seal 48 of adhesive sealant such as LIXON brand 101001 epoxy available through Chugai Voyeki, 500 Fifth Ave., New York, N.Y. Seal 48 extends substantially around the entire perimeter between the two elements with the exception of a small space or gap located at one edge of reflector assembly 14. It is through this gap that an electro-optic medium such as electrochemichromic fluid or liquid crystal material is inserted to fill the void within gap 34 and contained by seal 48. A preferred electrochemichromic medium is a liquid solution comprising 0.05 molar benzylviologen tetrafluroborate, 0.05 molar, 5,10-dihydro-5,10 dimethylphenazine, and 0.05 molar tetrabutyl ammonium tetrafluoroborate dissolved in propylene carbonate.

Alternately, gap 34 may contain a thickened liquid, gel or semi-solid material such as the formulations described in Schoot U.S. Pat. No. 3,806,229. In electrochromic mirrors, a material such as poly-AMPS available from Lubrizol Corp. of Wickliffe, Ohio, may be used. Gap 34 is typically 50 to 150 microns for such materials. A suitable liquid crystal material is a guest host dye such as D5 produced by BDH Co. of Dorset, England dissolved in N-type nematic liquid crystal such as n-(p-methoxybenzilidene)-p'-butylaniline. For such material, gap 34 is typically 8 to 12 microns. Medium 52 is introduced into and fills sealed gap 34 with a vacuum drawn on a surrounding chamber (several thousand Torr), placing the edge of assembly 14 including gap 50 within electrochemichromic solution 52 and then releasing the vacuum in the chamber. Medium 52 may also be injected into gap 34 by a syringe. With fluid 52 in place, the gap in seal 48 is closed by an epoxy such as LIXON, described above.

The amount of electrochemichromic fluid 52 required to fill the chamber defined by sealed gap 34 is substantially small since the width or thickness of gap 34 is on the order of 50–150 microns (u). This distance is readily achieved by small glass beads contained within the adhesive sealant. Such sealant is preferably silk-screened onto one or both of ITO coated surfaces 28 or 36 before they are pressed together in face-to-face relationship. Interlayer element 44, 46 is also preferably located on one of ITO coated surfaces 28 or 36 and spaced from adhesive 48 before being sandwiched and bonded between elements 24 and 32 with pressure and heat. Interlayer material 44, 46 is also preferred to be chemically and electrically inert and compatible with electrochemichromic medium 52.

In order to actuate electrochemichromic medium 52, an electrical charge in the form of direct current is applied across the medium. This is accomplished in a well-known fashion by coupling ITO layers 30, 40 to opposite poles of a DC circuit. Typically, the circuit is controlled by a photocell such as sensor 56 which senses the amount of glare or light incident upon the reflector assembly. Because it is desired to maximize the useful reflective area of a mirror assembly, sensor 56 and sensor circuit 16 are located behind back element 32 with the sensing portion oriented toward the rear of the vehicle through window 43 formed in reflective layer 42. This is also directly opposite and optically aligned with interlayer 44 displacing electrochemichromic medium 52. In this fashion, sensor 56 may detect light radiation incident upon the mirror assembly unattenuated by the coloration of electrochemichromic medium 52 controlled by sensor 56 and associated circuitry 16. Sensor circuit 16 is preferably of the type described in Gahan et al. U.S. Pat. No. 4,793,690, Gahan U.S. Pat. No. 4,799,768 or Molyneux et al. U.S. Pat. No. 4,886,960, all of which are incorporated by reference herein.

In the alternative, or in addition to sensor 56 mounted behind back element 32, display package 18 may be located within mirror assembly 10. Display package 18 includes a circuit 18 and a display 58 to visually depict desired information. One such package 18 and display 58 may be a compass rose or other indicia related to vehicle operation. Display 58 may be lighted, back lit, or electroluminescent and is preferably mounted flush against the rear surface 38 of back element 32 to prevent double imaging. Just as with sensor 56, a sufficient area of reflective layer 42 is removed from element 32 to accommodate the display area. Moreover, directly opposite window 43 in reflective layer 42 for display 58 is a block of polymeric interlayer 46 joining equal surface areas on front and back elements 26 and 32. Just as with sensor 56, display interlayer 46 acts like a dam, preventing electrochemichromic medium 52 from passing in front of display 58.

Figure 4:
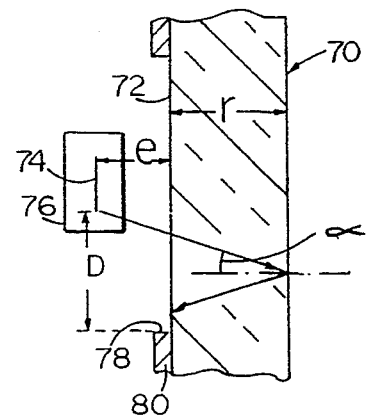
FIG. 4 is an enlarged, fragmentary sectional view of a window and display illustrating the preferred method of calculating the window boundary.

Although for each of the above applications it is sufficient to remove just enough of reflective layer 42 to accommodate the sensor 56 or display 58, it is preferred to remove a larger area of reflective layer 42 for displays in proportion to the distance between surface 38 of element 32 and surface 26 of element 24. This is done to reduce the number of multiple images reflected from display 58 and multiplied between front surface 26 of element 24 and reflective/rear surface 42, 38 of back element 32. For example, as seen in FIG. 4, assume a reflective assembly 70, such as a single reflective layer or electrochromic cell, has a thickness (r) of 4.5 millimeters, and a distance (e) from rear surface 72 to emitting element 74 of 4.2 millimeters. Also assume that the refractive index (RI) of assembly 70 is approximately 1.52. Based upon these particular characteristics, the lateral distance of boundary (D) between emitting element 74 in display 76 and the edge of window 78 formed in reflective coating 80 is 3 millimeters approximated according to the expression $$D = \text{Tan}\alpha \left( \frac{2r + e}{RI} \right)$$

where:
r is the thickness of the assembly 70;
e is the distance from emitter 74 to surface 72;
alpha ($\alpha$) is the angle of incidence from emitter 74;
RI is the refractive index of assembly 70; and
D is the lateral distance or boundary between emitter 74 and the edge of reflective layer 80.

The above expression provides an approximated solution for a window boundary about all sides of a display such as 76 for incident angles less than 30 degrees.

It is preferred in electro-optic environments (FIG. 3) that display 58 be slightly offset in window 43 in a direction away from the driver. This provides optimum positioning of display 58 so that an image generated thereby may be viewed within the center of display interlayer 46. In this situation, the optical alignment of window 43 in reflective layer 42, and the displacement of electrochemichromic medium 52 in front of display 58, cause the indicia exhibited by display 58 to be unattenuated by the coloration of medium 52.

In operation, elements 24 and 32 are formed from soda lime glass or other transparent medium in the desired shape to fit within housing 12. Preferably, rear surface 38 of back element 32 receives a reflective layer coating 42 except those areas adapted to be in front of a sensor 56 and/or a display 58. In the alternative, the entire rear surface 38 may be coated with only portions mechanically removed during assembly. Rear surface 28 of element 24 and front surface 36 of element 32 have a thin, electrically conductive coating 30, 40 thereon such as ITO, in order to conduct electric current along each surface.

Before placing the two elements 24 and 32 in face-to-face contact, adhesive 48 is disposed about the coincident peripheral area between the two elements. Adhesive 48 includes glass beads of the appropriate dimension to act as spacers between elements 24 and 32. Also prior to joining, one or more inert, light transmitting polymer interlayers 44, 46 are located at the appropriate areas on element 24 or 32 and spaced away from adhesive sealant 48. Both adhesive sealant 48 and interlayers 44, 46 may be fixed or bonded to elements 24 or 32 by machine. Following positioning of adhesive sealant bead 48 and polymer interlayer(s) 44, 46, elements 24 and 32 are joined in face-to-face engagement through the use of heat and pressure such that surfaces 28 and 36 which received ITO coatings 30, 40 face each other and sandwich interlayer(s) 44, 46, and leave a space or gap elsewhere between the surfaces. Such heat and pressure securely adheres and bonds interlayers 44, 46 to the ITO coated element surfaces 30, 40. The edges of elements 24, 32 are preferably offset as shown in FIG. 2 as described below. Once the adhesive sealant 48 is cured (time, temperature or both), electrochemichromic, or liquid crystal, fluid is introduced between elements 24 and 32 according to the above-described techniques, and as further elaborated in Lynam U.S. Pat. No. 5,073,012 which is incorporated herein by reference.

Once reflector assembly 14 has been completed, metallic layers 30, 40 are each coupled to opposite leads of a DC circuit by ribbon bands 60 which are retained along opposite, offset peripheral edges 62 of elements 24 and 32. Each ribbon 60 in turn is fastened to a conductor 64 from circuit 16. Alternately, mirror assemblies with other types of electrical connections and perimeter coatings may be used as described in Lynam et al. U.S. Pat. No. 5,066,112, the disclosure of which is hereby incorporated by reference herein. In addition, glare reduction may be further enhanced by including an anti-reflective coating on the front surface of element 24 as described in Lynam U.S. Pat. No. 5,076,674, the disclosure of which is hereby incorporated by reference herein. Reflector assembly 14, together with sensor and/or display package 18, is then mounted in housing 12 and is ready for installation in the vehicle.

Although each of the embodiments above have been described with reference to electrochromic or electrochemichromic mediums 52, substantially the same applications may be made with respect to liquid crystal cells used to color/darken the reflective area by scattering incident light. It should also be understood that the windows created above in the electrochemichromic field may be located anywhere within the field.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows.

1. An electrochromic rearview mirror for a vehicle comprising:
   first and second spaced, optically transparent elements, each having a front and rear surface and defining a space between said rear surface of said first element and said front surface of said second element;
   a reflective layer on one surface of said second optically transparent element;
   at least one optically transparent interlayer sandwiched between said first and second spaced optically transparent elements and in intimate contact therewith, said interlayer having an area less than said first and second spaced optically transparent elements, said optically transparent interlayer having a refractive index substantially equal to a refractive index of said first and second spaced elements;
   an electrochromic medium confined in said space between said rear surface of said first element and said front surface of said second element and not occupied by said optically transparent interlayer;
   means for sealing said electrochromic medium within said space; and
   means for applying an electric field to said electrochromic medium to cause variation in the light transmittance of said medium.

2. The electrochromic rearview mirror of claim 1 wherein said optically transparent interlayer is selected from the group consisting of polyvinyl butyral, polyurethane, and ionomer resin.

3. The electrochromic rearview mirror of claim 1 wherein said electrochromic medium is an electrochemichromic medium.

4. The electrochromic rearview mirror of claim 1 wherein said reflective layer is chosen from the group of aluminum, chromium, stainless steel, rhodium, platinum, palladium, copper, silver and combinations thereof.

* * * * *